No. 693,903. Patented Feb. 25, 1902.
C. PUTMAN.
WAGON SPINDLE.
(Application filed Sept. 24, 1901.)
(No Model.)
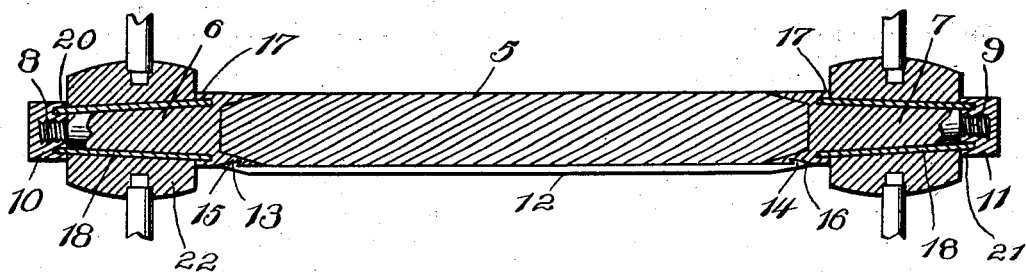
Fig. 1.
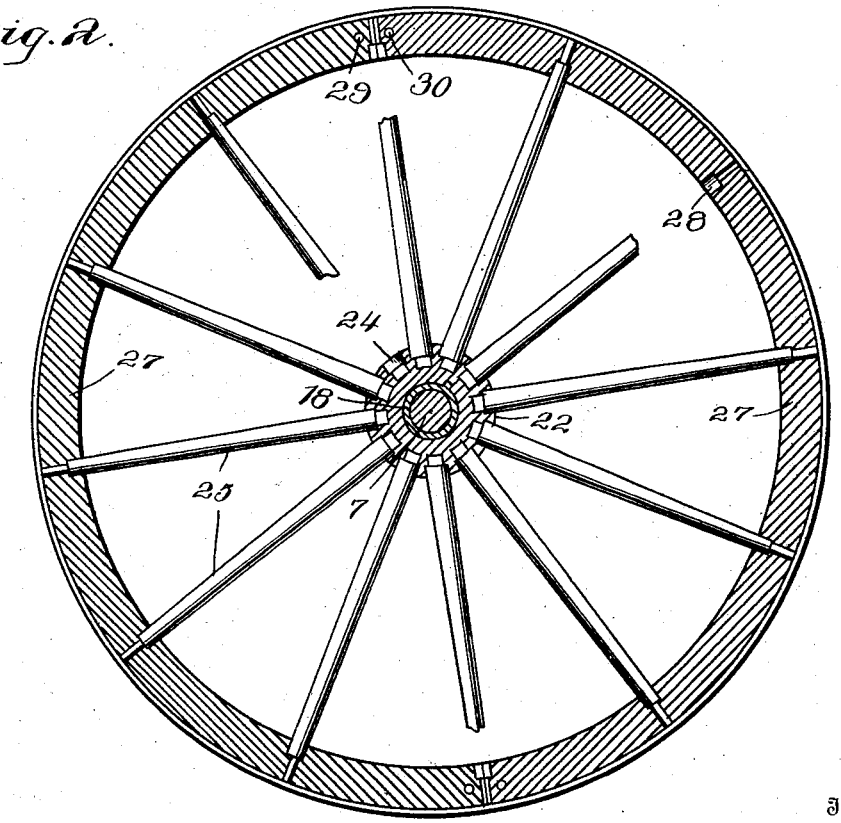
Fig. 2.
Witnesses
T. P. Brett
Harry & ... Chandler
Inventor
C. Putman
By Chandler & Chandler
Attorneys
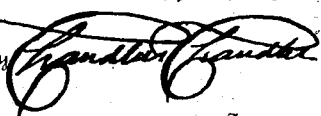

UNITED STATES PATENT OFFICE.

CALVIN PUTMAN, OF ANDERSON, MISSOURI.

WAGON-SPINDLE.

SPECIFICATION forming part of Letters Patent No. 693,903, dated February 25, 1902.

Application filed September 24, 1901. Serial No. 76,382. (No model.)

*To all whom it may concern:*

Be it known that I, CALVIN PUTMAN, a citizen of the United States, residing at Anderson, in the county of McDonald, State of Missouri, have invented certain new and useful Improvements in Wagon-Spindles; and I do hereby declare the following to be a full, clear, and exact description of the invention, such as will enable others skilled in the art to which it appertains to make and use the same.

This invention relates to vehicles in general, and more particularly to the wheels and spindles thereof, the object of the invention being to provide a construction wherein the spindles will be held securely to the axle, a further object of the invention being to provide a construction and arrangement wherein dust and other foreign matter will be excluded from the bearing portions.

Other objects and advantages of the invention will be understood from the following description and include a construction of wheel having great strength and durability.

In the drawings forming a portion of this specification and in which like numerals of reference indicate similar parts in both views, Figure 1 is a vertical section taken longitudinally through an axle constructed and equipped in accordance with the present invention. Fig. 2 is a section taken through the wheel and including the spokes.

Referring now to the drawings, there is shown an axle 5, the ends of which are reduced and tapered to receive metal spindles 6 and 7, having the reduced and threaded outer ends 8 and 9 to receive nuts 10 and 11 for holding the wheels in place upon the spindles.

To hold the spindles in place upon the axle, a holding-bar 12 is provided and at the ends of which are formed the hooks 13 and 14, having their bills directed toward each other, as shown. At the inner ends of the spindles are formed the circumscribing hook-flanges 15 and 16, and after the spindles have been put in place the holding-bar is heated to expand it to a proper length, and the hooks thereof are then engaged with the corresponding hook-rings, after which the bar is allowed to cool, and by shrinkage the hooks are drawn tightly into engagement with the rings to hold the spindles in place.

From the outer edge of the enlarged inner end of each spindle projects an annular flange 17, concentric with the spindle, and each of these flanges engages over the projecting inner end of the boxing 18 of the wheel-hub disposed upon its spindle. The nuts 10 and 11 have also annular flanges 20 and 21, which engage over and closely fit the projecting outer ends of the boxings, and thus access of foreign matter to the interiors of the boxings is prevented.

The wheel, as shown, comprises a hub 22, having a boxing 23 extending entirely therethrough and projecting from the ends thereof. In the hub are formed the spoke-receiving recesses 24, which are countersunken, as shown, and the spokes 25 have their inner ends reduced to fit the inner ends of the recesses, the body of each spoke fitting closely into its corresponding countersinking of the hub.

The felly 27 of the wheel is formed in two sections, as shown, and in the felly are formed the perforations 28 to receive the outer ends of the spokes, the perforations being countersunken at their inner ends to receive the bodies of the spokes, which latter have their outer ends reduced to fit the minor portions of the perforations. As shown, some of the perforations are formed partly in each of two meeting ends of different felly-sections, so that the joints are braced and the same strength is given to the wheel as if two spokes were disposed side by side at the meeting ends. Rivets 29 and 30 are passed through the felly-sections at the ends thereof to prevent splitting. Instead of the ring-hooks formed by the circumscribing flanges 15 and 16 simple hooks may be formed, as will be understood.

In practice modifications of the specific construction shown may be made, and any suitable materials and proportions may be used for the various parts without departing from the spirit of the invention.

What is claimed is—

1. The combination with an axle having spindles engaged therewith and provided with hooks, of a single, rigid holding-bar secured flat against the axle and having terminal hooks engaged over the hooks of the spindles to hold the spindles in position.

2. The combination with a spindle having an enlarged inner end provided with an annular flange projecting over and concentric with the reduced portion of the spindle, of a wheel disposed upon the spindle and having a boxing engaged within the flange, and a nut engaged with the spindle and having a flange in which is received the outer end of the boxing.

In testimony whereof I affix my signature in presence of two witnesses.

CALVIN PUTMAN.

Witnesses:
S. C. ROBERTS,
H. WESLEY MANNING.